C. D. CLIPFELL AND G. MANIKOWSKE.
WINDMILL.
APPLICATION FILED MAR. 25, 1918.

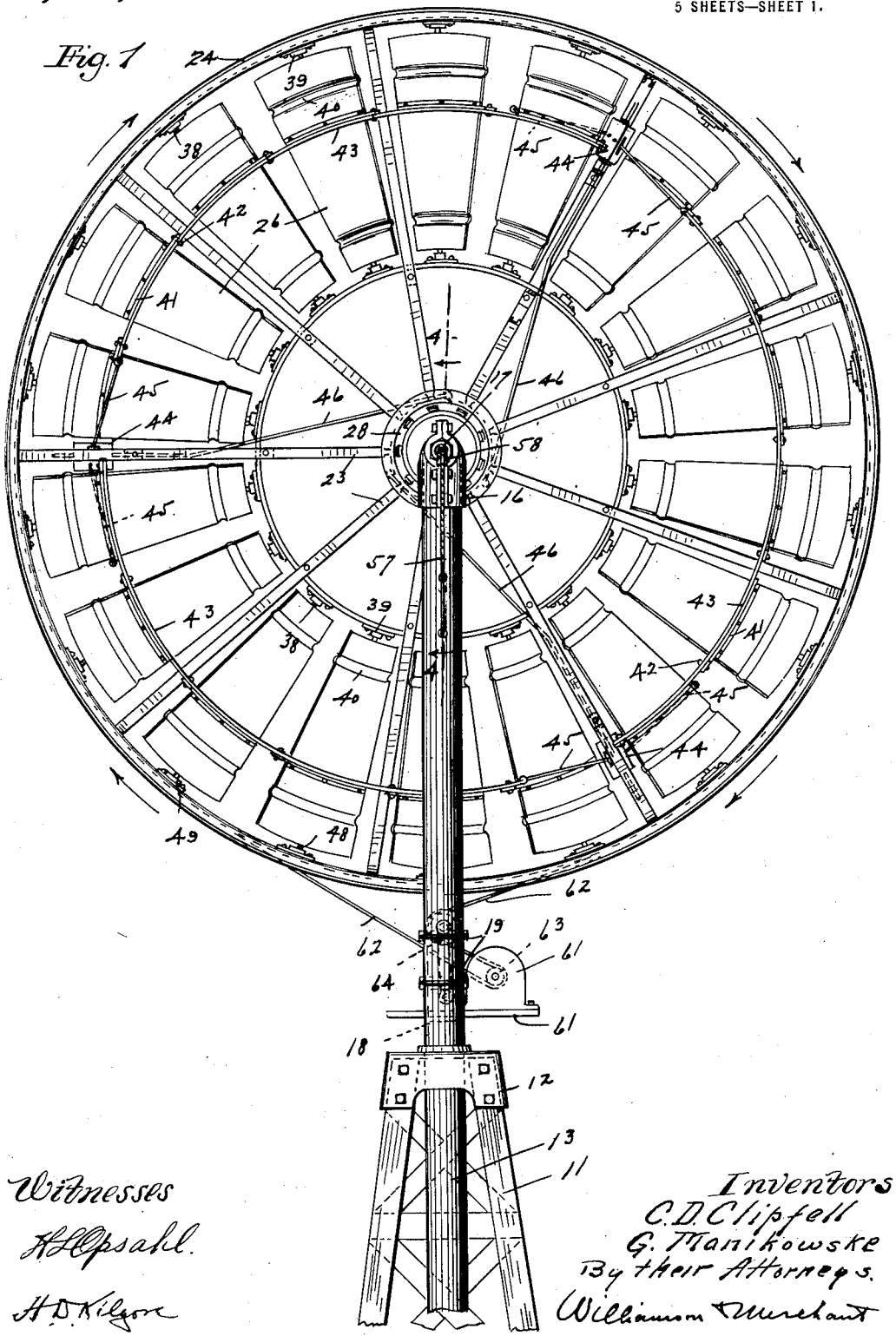

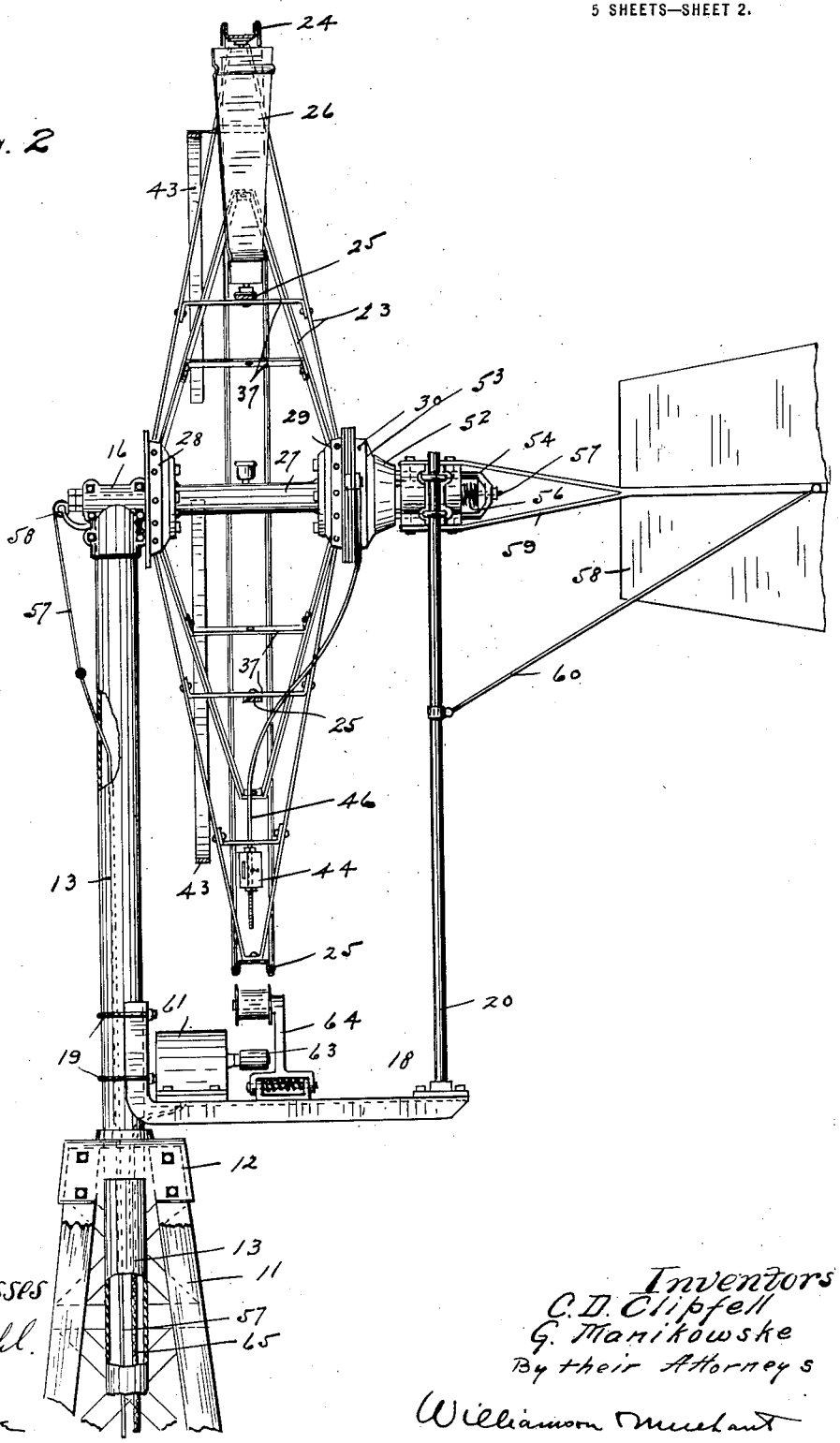

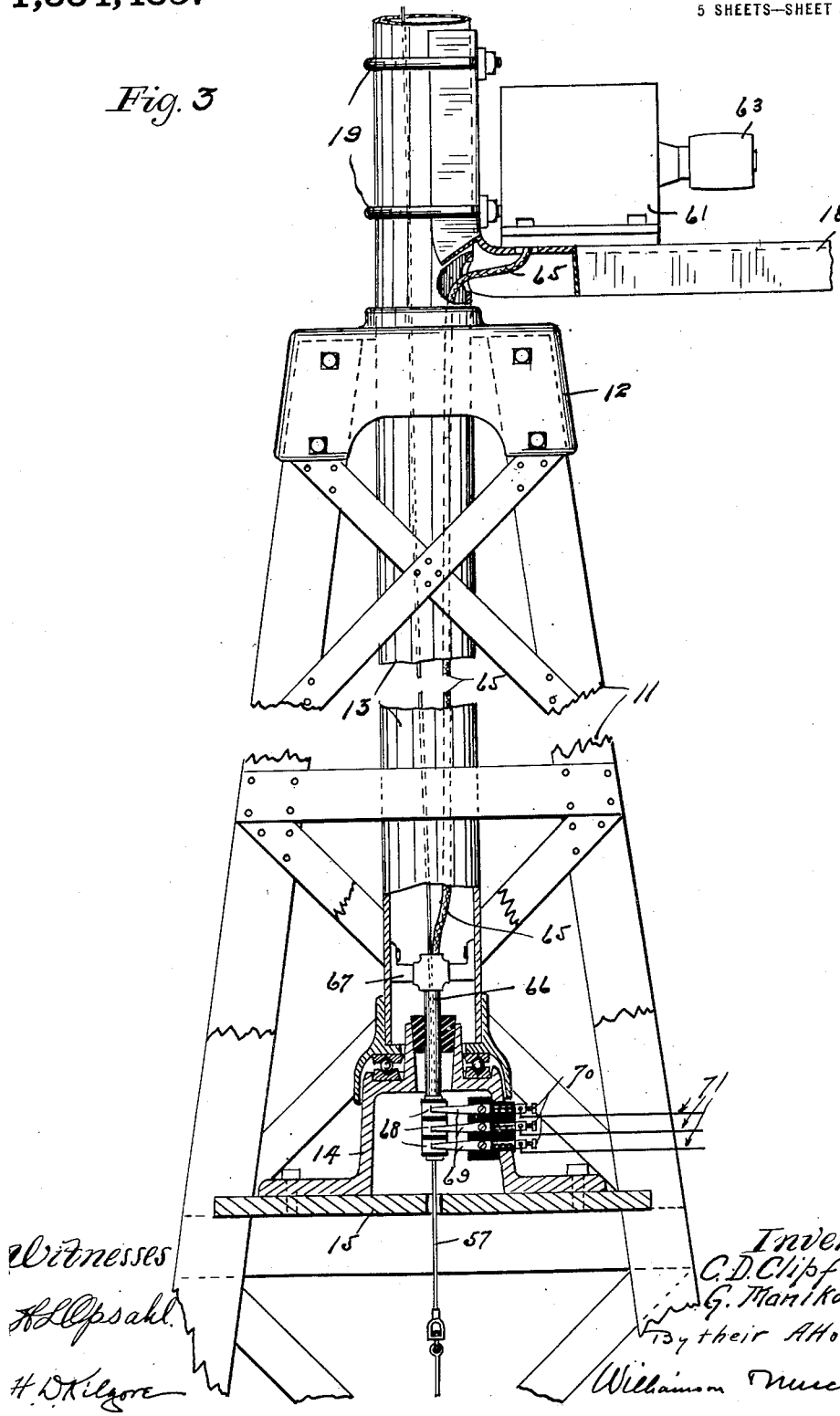

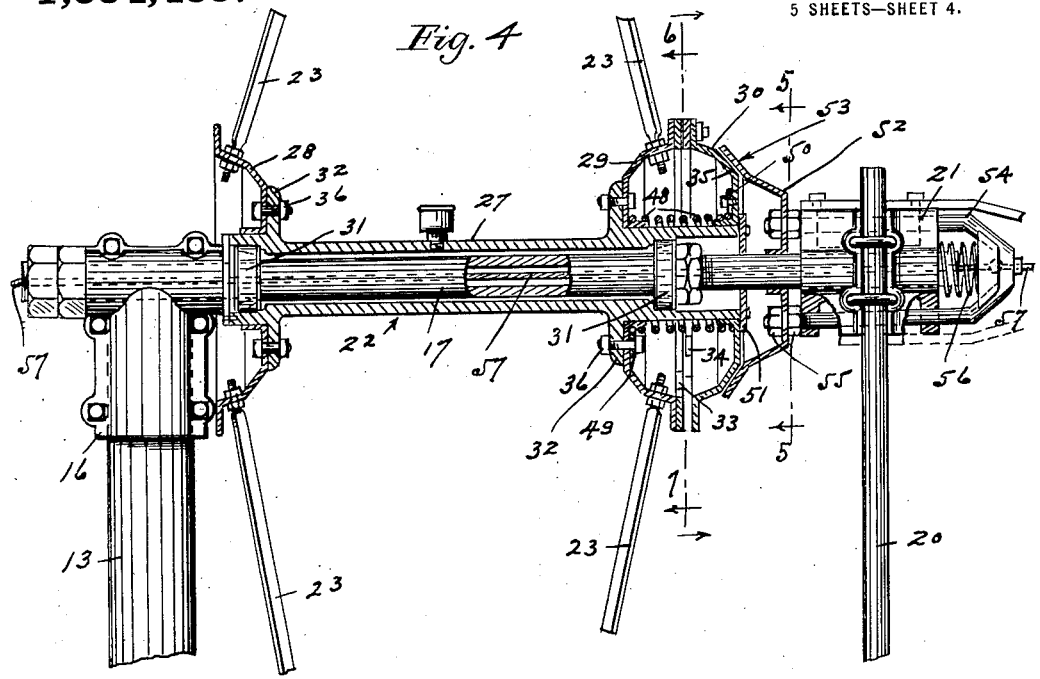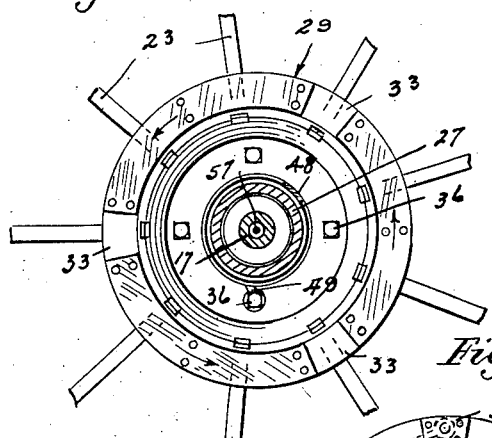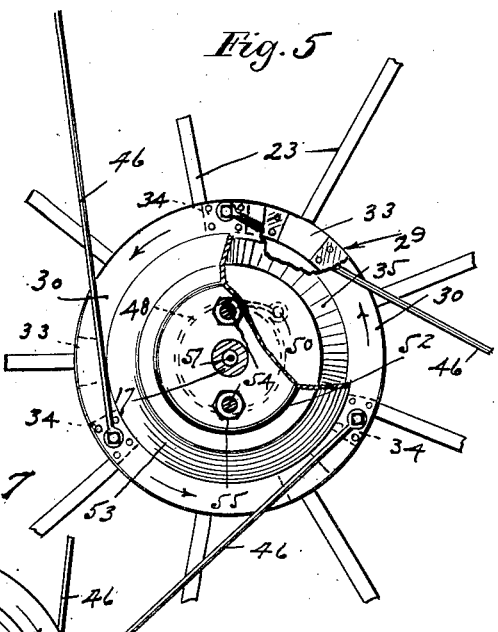

1,334,485.

Patented Mar. 23, 1920.
5 SHEETS—SHEET 5.

Witnesses
H. L. Opsahl.
H. D. Kilgore.

Inventors
C. D. Clipfell
G. Manikowske
By their Attorneys
Williamson & Merchant

UNITED STATES PATENT OFFICE.

CARROLL D. CLIPFELL AND GEORGE MANIKOWSKE, OF WYNDMERE, NORTH DAKOTA, ASSIGNORS TO WIND ELECTRIC CORPORATION, OF WYNDMERE, NORTH DAKOTA, A CORPORATION OF NORTH DAKOTA.

WINDMILL.

1,334,485.  Specification of Letters Patent.  Patented Mar. 23, 1920.

Application filed March 25, 1918. Serial No. 224,434.

*To all whom it may concern:*

Be it known that we, CARROLL D. CLIPFELL and GEORGE MANIKOWSKE, citizens of the United States, residing at Wyndmere, in the county of Richland and State of North Dakota, have invented certain new and useful Improvements in Windmills; and we do hereby declare the following to be a full, clear, and exact description of the invention, such as will enable others skilled in the art to which it appertains to make and use the same.

Our invention relates to improvements in windmills intended for general use, but especially adapted for use in generating electricity, for private plants to supply the necessary power for lighting purposes, for running light machinery on farms or elsewhere. To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Figure 1 is a front elevation of the improved windmill;

Fig. 2 is a side elevation of the same;

Fig. 3 is a fragmentary detail view partly in side elevation and partly in central vertical section, illustrating, on an enlarged scale, the parts of the windmill, in the vicinity of the lower extremity of the mast;

Fig. 4 is a view partly in side elevation and partly in vertical section taken on the line 4—4 of Fig. 1;

Fig. 5 is a fragmentary detail view with some parts sectioned on the line 5—5 of Fig. 4;

Figure 8:
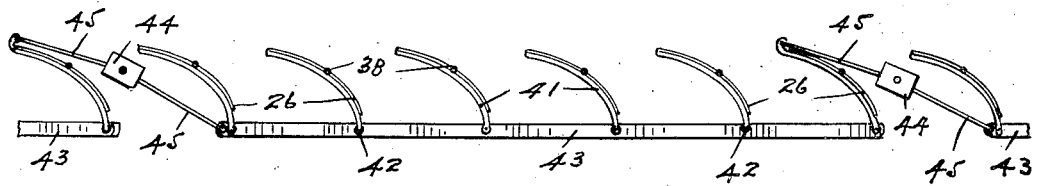
Figure 9:
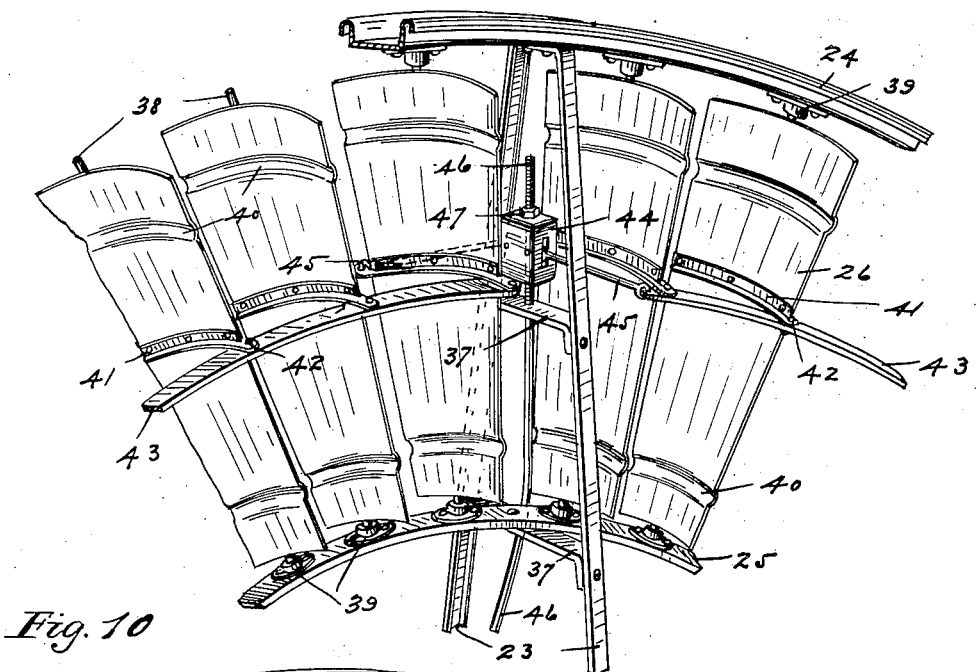
Figure 10:
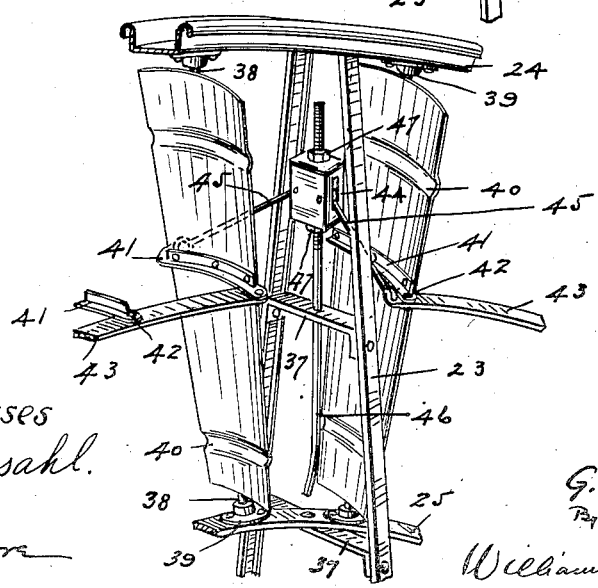

Figs. 6 and 7 are views in transverse section taken on the lines 6 and 7 respectively of Fig. 4, on an enlarged scale, and looking at the former toward the left and at the latter toward the right;

Fig. 8 is a fragmentary edge view in diagram, of the windmill with the outer rim removed;

Fig. 9 is a fragmentary perspective view of the wind-wheel with its sails set transversely into the wind; and Fig. 10 is a view corresponding to Fig. 9, with the exception that less of the wheel is shown and the sails are set edgewise to the wind.

The numeral 11 indicates a windmill tower of standard construction, with the exception that the upper ends of its converging uprights are rigidly connected by a cast rectangular bearing head 12, having in its top plate a flanged central opening to receive a revoluble tubular mast 13. The customary platform at the top of the tower 11 has been omitted from the drawing but in actual construction of the tower the same will be provided. To give stability to the mast 13, the same is extended considerably below the bearing head 12 and supported on a step bearing 14, secured to a small platform 15 carried by the tower 11.

Clamped on the upper end of the mast 13, is a head 16, in which is rigidly secured the inner end of a tubular radial shaft 17. A narrow radial shelf 18 is secured to the mast 13, just above the bearing head 12, for rotation therewith and, as shown, is made from an inverted channel bar, the inner end of which is bent upward with its side flanges embracing said mast. Clips 19 are passed around the upturned inner end of the shelf 18 and mast 13 and frictionally clamp said shelf to the mast. Supported on the outer end of the shelf 18, is a standard 20, having on its upper end a two part head 21, in which the outer end of the shaft 17 is rigidly clamped and supported in a horizontal position.

Mounted on the shaft 17, between the heads 16 and 21, is a wind-wheel comprising a hub 22, spokes 23, outer rim 24, inner rim 25, and radially disposed sails 26. The hub 22 comprises a spindle 27 and saucer-like members, 28, 29 and 30 that, as shown, are identical the one with the other and pressed from sheet metal. The spindle 27 is journaled on the shaft 17 with anti-friction bearings 31 interposed therebetween, and integral with said spindle is a pair of axially spaced annular flanges 32. Flanged axial openings are formed in the hub members 28, 29 and 30, to receive the spindle 27, and the rims of said members terminate in wide flanges, which project at right angles to said spindle. These flanges are only important in the hub members 29 and 30 wherein they afford clutch flanges. The former of these clutch flanges has riveted thereto, segmental blocks, circumferentially spaced to afford the notches or seats 33 of a half clutch. To the latter of these clutch flanges is riveted lugs 34, which afford the second half clutch. These clutch lugs 34 are circumferentially spaced to enter the clutch seats 33 and together therewith, afford a positive clutch, to lock the movable hub member 30, to the hub 22, for common rotation therewith. Each hub member 28, 29 and 30 has its side pressed, to form a beveled annular surface, which is only important in the hub member 30, wherein it affords a brake surface 35.

The hub members 28 and 29 are slipped onto the spindle 27, outward of the flanges 32 and are rigidly secured thereto, by nut-equipped bolts 36. The rim flanges of the hub members 28 and 29 are turned outward, and said hub member 28 is located adjacent to the mast head 16. The movable hub member 30 is slipped onto the spindle 27, outward of the hub member 29, with freedom for both axial sliding and rotary movements, with its half clutch 34 turned toward the coöperating half clutch 33.

The spokes 23 are U shaped and their diverging members have their ends rigidly secured, to the fixed hub members 28 and 29 and their short transverse intermediate portions are rigidly secured to the outer rim 24. It will be noted that this rim is channel shaped in cross section, to receive a driving belt, as will presently appear. The members of each spoke 23 are reinforced by transverse inner and outer tie bars or braces 37, the former of which supports the inner rim 25, which is rigidly secured thereto.

The sails 26, as shown, are formed from sheet metal and are concavo-convex in cross section, with their concave sides at the front of the wind wheel. Rigidly secured to the ends of the sails 26, intermediate of their longitudinal edges, are inner and outer trunnions 38. These are journaled in bearings 39, secured to the rims 24 and 25. These pairs of bearings 39 are located on the radial line of the wind wheel and support the sails 26, for turning movement, transversely into the wind or directly with the wind. Each sail 26 is suitably reinforced, by pressing therefrom, transverse inner and outer ribs 40 and riveting to the back thereof, a transverse rib 41, as shown in the form of an angle bar. The outturned flanges of the ribs 41, are extended forward of the front longitudinal edges of the blades 26, and pivoted at 42, to three segmental operating bars 43, which connect said sails in a like number of groups.

The three groups of sails 26 are connected, for simultaneous opening and closing movements, by centrifugal governor weights 44 and pairs of links 45. The governor weights 44 are located, within the spokes 23, between the several groups of sails 26 and the links 45, of each pair, project in opposite directions and have their inner ends pivotally connected to opposite sides of said weights, for radial swinging movement in respect to the wind wheel. The pairs of links 45 extend obliquely and transversely through the wind-wheel, between the several groups of sails 26. One link 45 of each pair has its outer end pivotally attached to the adjacent end of one of the connecting bars 43; the outer end of the other link, of the respective pair, is pivotally connected to the projected end of the adjacent intermediate rib 41 of the other group of sails 26. It will thus be seen that each pair of links 45 and the respective governor weight 44, connects adjacent groups of sails 26, on opposite sides of the wind-wheel.

The governor weights 44 are connected to the movable hub member 30, at circumferentially spaced points, by long rods 46 pivoted thereto and having their outer ends extended radially through said governor weights. Opposing nuts 47 have screw threaded engagement with the rods 46, engage the inner and outer surface of the governor weights 44 and secure said weights thereon, with freedom for radial adjustment, with respect to the wind-wheel. It will be noted that the rods 46, extend through bores in the braces 37 and are guided thereby.

Encircling the spindle 27, within the housing formed by the hub members 29 and 30, is a coiled spring 48, having one of its ends anchored at 49, to the hub member 29 and having its other end anchored at 50, to the movable hub member 30. This spring 48 is under torsional strain, to rotate the movable hub member 30, on the spindle 27, in the direction of the arrows marked on Figs. 5 and 7, which is in a reverse direction to the rotation of the wind-wheel, which is in the direction of the arrows marked on Fig. 1, and yieldingly hold the half clutch members 33 and 34 out of circumferential alinement, as shown in Fig. 5. Said spring 48 also normally and yieldingly holds the movable hub member 30, in a position to release the half clutch members 33 and 34. A disk 51 on the outer end of the spindle 27, affords a stop, against which the spring 48, yieldingly holds the movable hub member 30, with the half clutch members 33 and 34 released.

By means of the rods 46, the spring 48 normally and yieldingly holds the governor weights 44 in their innermost positions and in turn, these weights normally hold the sails by means of the link 45, set transversely into the wind. As the velocity of the wind-wheel increases the governor weights 44 move radially outward, under centrifugal force, and gradually set the sails 26 into the wind, to reduce their resistance. At the same time the governor weights 44 rotate the movable hub member 30, on the spindle 27, against the tension of the spring 48. When the velocity of the wind-wheel is again reduced, the spring 48 overcomes the centrifugal force of the governor weights and as these move inward, gradually set the sails 26 edgewise to the wind, thus reducing their effective area. It will thus be seen that the wind-wheel may be kept at a substantially constant and predetermined speed.

To lock the wind-wheel against turning movement on the shaft 17, the half clutch members 33 and 34 are interlocked by a friction brake 52 which, like the hub members 28, 29 and 30, is pressed from sheet metal, with a flanged axial opening to receive the shaft 17, which supports the brake for axial sliding movement thereon. This brake 52 is provided with a flaring annular friction flange 53, of the same bevel as the friction surface 35 on the movable hub member 30, and when moved thereagainst, causes an axial movement of the hub member 30 on the spindle 27 toward the hub member 29. The brake 52 also holds the hub member 30 against rotation on the spindle 27. With the hub member 30 held against rotation, the continued rotation of the wind-wheel, places the spring 48 under greater torsional strain and at the same time brings the half clutch member 33 into alinement with the half clutch member 34, thereby causing the same to interlock, under the axial movement of the hub member 30, under the action of the applied brake 52.

The brake 52 is held against rotation on the shaft 17, but with freedom for axial movement, by a yoke-like member 54. The arms of the member 54 are mounted, for endwise sliding movement parallel to the shaft 17, in a horizontal seat formed in the head 21, above and below said shaft.

The free ends of the arms of the yoke member 54 are extended through apertures in the brake 52 and rigidly secured thereto, by opposing nuts 55. A coiled spring 56, compressed between the outer end of the head 21 and the transverse portion of the yoke member 54, yieldingly holds the brake 52 released. The brake 52 is set by a flexible connection 57, attached to the transverse portion of the yoke member 54, extended axially through the spring 56, shaft 17, over a guide sheave 58, thence into the mast 13 and through the step bearing 14 and platform 15, to a point within r h from the ground.

Any suitable means may be provided for securing the lower end of the connection 57 to hold the brake 52 set against the tension of the spring 48. When the brake 52 is released the spring 48 returns the half clutch members 33 and 34.

By providing the mast 13 with a radially projecting shaft 17 and mounting the wind-wheel thereon, with its face toward said mast, the wind-wheel may be located, very close to the mast, which is highly desirable in securing a well balanced and rigid structure. To give stability to the wind-wheel the same is provided with a vane 58, the shank 59 of which is rigidly secured to the head 21 and forms a radial extension of the shaft 17. The vane 58 is further secured by a brace 60 extending from the standard 20.

Mounted on the shelf 18, is an electrical generator 61, which is driven from the wind-wheel by a belt 62, arranged to run over the rim 24 and a pulley 63 on the armature shaft of said generator. A yielding tightener 64, for the belt 62, is mounted on the shelf 18. Leading from the generator 61 are three wires held within a casing 65, which extend axially through the mast 13 and a depending axially located tube 66. The tube 66 is suspended from the lower end of the mast 13, for rotation therewith, by a bracket 67 with its lower end extending into the step bearing 14. On the lower end of the tube 66, within the step bearing 14, are three axially spaced collector rings 68, with which coöperate three brushes 69, insulated from said step bearing and having binding posts 70, to each of which, is attached a line wire 71.

What we claim is:

1. A windmill comprising a tower, a revoluble tubular mast having a tubular radial shaft, a hollow step bearing supporting the mast from the tower, a wind-wheel journaled on the shaft, a generator secured for rotation with the mast, a connection for driving the generator from the wind-wheel, said mast having a depending tube extending into the step bearing, collector rings on the lower end of said tube, wires connecting the generator and collector rings and extending through the mast and into said tube, brushes coöperating with the collector rings, line wires attached to the brushes, a brake for the wind-wheel, and a connection for setting the brake and extending through the mast, tube and collector rings.

2. A windmill comprising a shaft, a wind-wheel journaled on the shaft and having feathering sails, the hub of the wind-wheel having a movable member mounted for circumferential and axial movements, said hub and its movable member having normally released coöperating half clutch members, a centrifugal governor connected to the movable hub member and operative on the sails to normally hold the same set into the wind, and means operative on the movable hub member to set the clutch members and hold the sails set out of the wind.

3. A windmill comprising a shaft, a wind-wheel journaled on the shaft and having feathering sails, the hub of the wind-wheel having a movable member mounted for circumferential and axial movements, said hub and its movable member having normally released coöperating half clutch members, a centrifugal governor connected to the movable hub member and operative on the sails to normally hold the same set into the wind, and a brake operative on the movable hub member to set the clutch members and hold the wind-wheel with the sails set out of the wind.

4. A windmill comprising a shaft, a wind-wheel journaled on the shaft and having feathering sails, the hub of the wind-wheel having a movable member mounted for circumferential and axial movements, said hub and its movable member having coöperating positive half clutch members, a centrifugal governor connected to the movable hub member and sails, a spring operative on the movable hub member to normally hold the same with the half clutch members released and out of alinement and with said governor in a position to hold the sails set into the wind, and a brake operative on the movable hub member to set the clutch members after the same have been moved into alinement by the governor and also hold the wind-wheel with the sails set out of the wind.

5. A windmill comprising a shaft, a wind-wheel journaled on the shaft and having feathering sails connected in groups for simultaneous movement, the hub of the wind-wheel having a movable member mounted for circumferential and axial movements, said hub and its movable member having coöperating positive half clutch members, a plurality of circumferentially spaced governor weights, rods connecting the governor weights to the movable hub member, links connecting the governor weights to opposite sides of the sails and to adjacent groups thereof, a spring operative on the movable hub member to normally hold the same with the half clutch members released and out of alinement and with the governor weights in position to hold the sails set into the wind, and a brake operative on the movable clutch member to set the clutch members after the same have been moved into alinement by the governor and also hold the wind-wheel with the sails set out of the wind.

6. A windmill comprising a shaft, a wind-wheel journaled on the shaft and having feathering sails, the hub of the wind-wheel having a movable member mounted for circumferential and axial movements, said hub and its movable member having normally released coöperating positive half clutch members, a centrifugal governor connected to the movable hub member and sails, a torsional spring anchored to the hub and its movable member and under strain to move the movable hub member both axially and circumferentially to normally hold the half clutch members released and out of alinement and also normally hold the governor with the sails set into the wind, said movable hub member having a brake surface, a brake coöperating with said brake surface to set the clutch members after the same have been moved into alinement by the governor and also hold the wind-wheel with the sails set out of the wind, a spring normally holding the brake released, and a connection extending to a distant point for setting the brake.

7. A windmill comprising a tubular revoluble mast having a tubular radial shaft, a wind-wheel journaled on the shaft and having feathering sails, the hub of the wind-wheel having a movable member mounted for circumferential and axial movements, said hub and its movable member having normally released coöperating positive half clutch members, a centrifugal governor connected to the movable hub member and sails, a torsional spring anchored to the hub and its movable member and under strain to move the movable hub member both axially and circumferentially to normally hold the half clutch members released and out of alinement and also normally hold the governor with the sails set into the wind, said movable hub member having a brake surface, a brake coöperating with said brake surface to set the clutch members after the same have been moved into alinement by the governor and also hold the wind-wheel with the sails set out of the wind, a spring normally holding the brake released, and a connection extended through the mast and shaft for setting the brake.

In testimony whereof we affix our signatures in presence of two witnesses.

CARROLL D. CLIPFELL.
GEORGE MANIKOWSKE.

Witnesses:
LARS OLSGARD,
MAHLON O. NELSON.